United States Patent [19]

Febvre

[11] Patent Number: 5,333,197
[45] Date of Patent: Jul. 26, 1994

[54] SYSTEM TO PREVENT A SCRAMBLER FROM GENERATING UNDESIRED SYMBOLS

[75] Inventor: Paul R. Febvre, Suffolk, England

[73] Assignee: British Telecommunications public limited company, London, England

[21] Appl. No.: 956,010

[22] PCT Filed: Apr. 12, 1991

[86] PCT No.: PCT/GB91/00579

§ 371 Date: Dec. 3, 1992

§ 102(e) Date: Dec. 3, 1992

[87] PCT Pub. No.: WO91/16778

PCT Pub. Date: Oct. 31, 1991

[30] Foreign Application Priority Data

Apr. 12, 1990 [GB] United Kingdom ............. 9008374.2

[51] Int. Cl.$^5$ .............................................. H04L 9/00
[52] U.S. Cl. ........................................ 380/48; 380/50
[58] Field of Search ................. 380/39, 44, 48–50; 375/1, 8, 110

[56] References Cited

U.S. PATENT DOCUMENTS

| | | | |
|---|---|---|---|
| 3,781,472 | 12/1973 | Goode et al. | 380/44 |
| 3,868,631 | 2/1975 | Morgan et al. | 380/49 |
| 3,886,313 | 5/1975 | Brunscome et al. | 380/39 |
| 4,079,188 | 3/1978 | Kinck, Jr. et al. | 380/49 |
| 4,477,912 | 10/1984 | Russell | 375/1 |
| 4,606,056 | 8/1986 | Perloff | 375/110 |
| 4,627,074 | 12/1986 | Murkwitz et al. | 380/49 |
| 4,771,463 | 9/1988 | Beeman | 380/48 |
| 4,811,357 | 3/1989 | Betts et al. | 375/1 |
| 5,012,489 | 4/1991 | Burton et al. | 375/8 |

FOREIGN PATENT DOCUMENTS

A199161 10/1986 European Pat. Off. .
2439444 5/1980 France .

OTHER PUBLICATIONS

PCT Search Report Considered for 91/00579

*Primary Examiner*—Salvatore Cangialosi
*Attorney, Agent, or Firm*—Nixon & Vanderhye

[57] ABSTRACT

A communication system is described in which data characters are each repeatedly encoded in an encoder (3) until an encoded character occurs which is not one of a predetermined set of characters, e.g. reserved characters. Each encoded character, whether or not that encoded character is one of the predetermined set is transmitted by the transmitter (4) to the receiver (5) and a decoded output character provided from the decoder (6) when the corresponding received character is determined not to be the one of the set of characters.

25 Claims, 4 Drawing Sheets

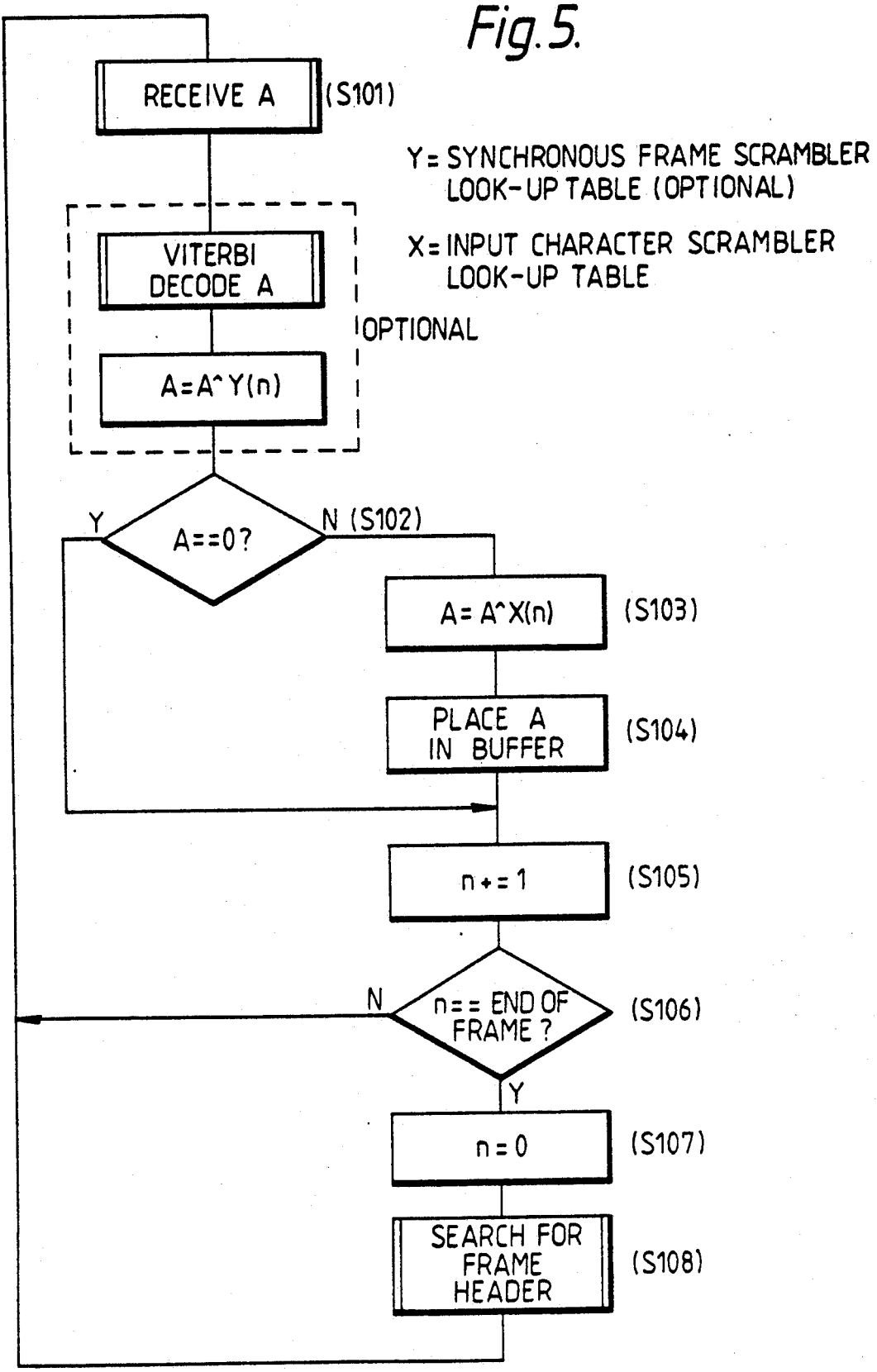

SYSTEM TO PREVENT A SCRAMBLER FROM GENERATING UNDESIRED SYMBOLS

BACKGROUND OF THE INVENTION

1. Field of the Invention

The present invention relates to a communications system, and in particular, though not exclusively, to a communication system incorporating a satellite link.

2. Related Art

In communications systems such as those having a satellite link, data is sent in a synchronous block mode to keep down the overhead of control and signalling information. Such a synchronous link is maintained in the absence of user data by transmitting a null character e.g. ASCII value 00H. A problem arises because the user data may contain the null character, and unless action is taken the receiving part of the synchronous link will discard a null in the user data as if it were not data. To indicate such characters to the receiving part of the link it is known to send "Escape" control sequences of characters but these increase the control overhead of a link sharply and are liable to cause significant errors if one of the characters of a sequence is lost in transmission. This is a particular example of the more general problem of transmitting data, over whatever medium, when that data includes so called reserved characters or characters which in the circumstances the receiving part of a link will not recognise as proper data.

SUMMARY OF THE INVENTION

According to the invention there is provided a communications system for handling a stream of data characters comprising:
  a transmitting part having:
    means for encoding an incoming data character into an encoded character,
    means for determining whether an encoded character is one of a predetermined set of characters,
    means, responsive to the determining means, for controlling the encoding means to repeatedly encode an incoming data character until an encoded character occurs which is not one of the predetermined set of characters, and
    means for transmitting either each encoded character, or when an encoded character is one of the predetermined set,
  a character from the predetermined set; and
  a receiving part having:
    means for receiving a transmitted character,
    means for determining whether or not a received character is one of the predetermined set of characters,
    means for decoding a received character so that a decoded character is provided from the receiver when the corresponding received character is determined not to be one of the set of characters.

According to a second aspect of the invention there is provided a data transmission system in which one or more characters are reserved for system use comprising an encoder, a transmitter, a receiver and a decoder; a data stream entering the system is coded by the encoder a character at a time and a test for the reserved character is performed on each encoded character, if this is positive the character is encoded again, all encoded characters are transmitted by the transmitter. After the transmitted characters have been received in the receiver the test for the reserved character is performed on each received character, if this is negative the received character is decoded by the decoder and passed out of the system as data.

According to a third aspect of the invention there is provided a communication system in which data characters are each repeatedly encoded in an encoder until an encoded character occurs which is not one of a predetermined set of characters; each encoded character, whether or not that encoded character is one of the predetermined set is transmitted by a transmitter to a receiver and a decoded output character provided from a decoder when the corresponding received character is determined not to be the one of the set of characters.

According to a fourth aspect of the invention there is provided a communication system for transmitting data from a discontinuous stream of data over a data link requiring a continuous stream of data comprising:
  a transmitting part having:
    means for encoding data in an incoming data stream on a character by character basis, which encoding varies between successive characters of the continuous stream,
    means for determining whether an encoded character is one of a predetermined set of characters,
    control means, responsive to the determining means, for controlling the encoding means to repeatedly encode incoming data until an encoded character occurs which is not one of the predetermined set of characters,
    detection means for detecting the absence of data in the incoming data stream,
    and transmitting means, responsive to the detection means, for transmitting in the absence of incoming data one of the predetermined set of characters, or when incoming data is present, each encoded character, unless an encoded character is one of the predetermined set when one of the predetermined set of characters is transmitted;
  a receiving part having:
    means for receiving transmitted characters to maintain the receiving part in synchronism with the transmitting part;
    means for determining whether or not a received character is one of the predetermined set of characters;
    means for decoding a received character, whereby a decoded character is provided from the receiver when the corresponding received character is determined not to be the one of the set of characters, and the decoding means being kept co-ordinated with the encoding means of the transmitting part through the receipt of successive transmitted characters.

Advantages of this invention are low overhead in additional information, resulting in a high data throughput, and a very small delay in translating the characters into and out of the synchronous data stream.

Where the transmissions are synchronous the invention takes advantage of the fact that a frame structure exists in the synchronous data stream, as is required for synchronisation purposes in the absence of an additional clock signal, e.g. most radio and two wire terrestrial links, so that the decoder can be synchronised to the encoder using the frame structure.

The invention is primarily concerned with the mechanism for translation of the information into the synchronous stream, but to maintain throughput at minimum delay it is necessary to operate some form of data flow control between the encoder and the source of the data. One method of achieving this that is simple and effective is to use software flow control.

BRIEF DESCRIPTION OF THE DRAWINGS

A preferred embodiment of the invention will now be described by way of example, and with reference to the accompanying drawings, wherein:

FIG. 5 is a flow diagram illustrating the operation of the decoder of FIG. 4.

DETAILED DESCRIPTION OF THE DRAWINGS

Figure 1:
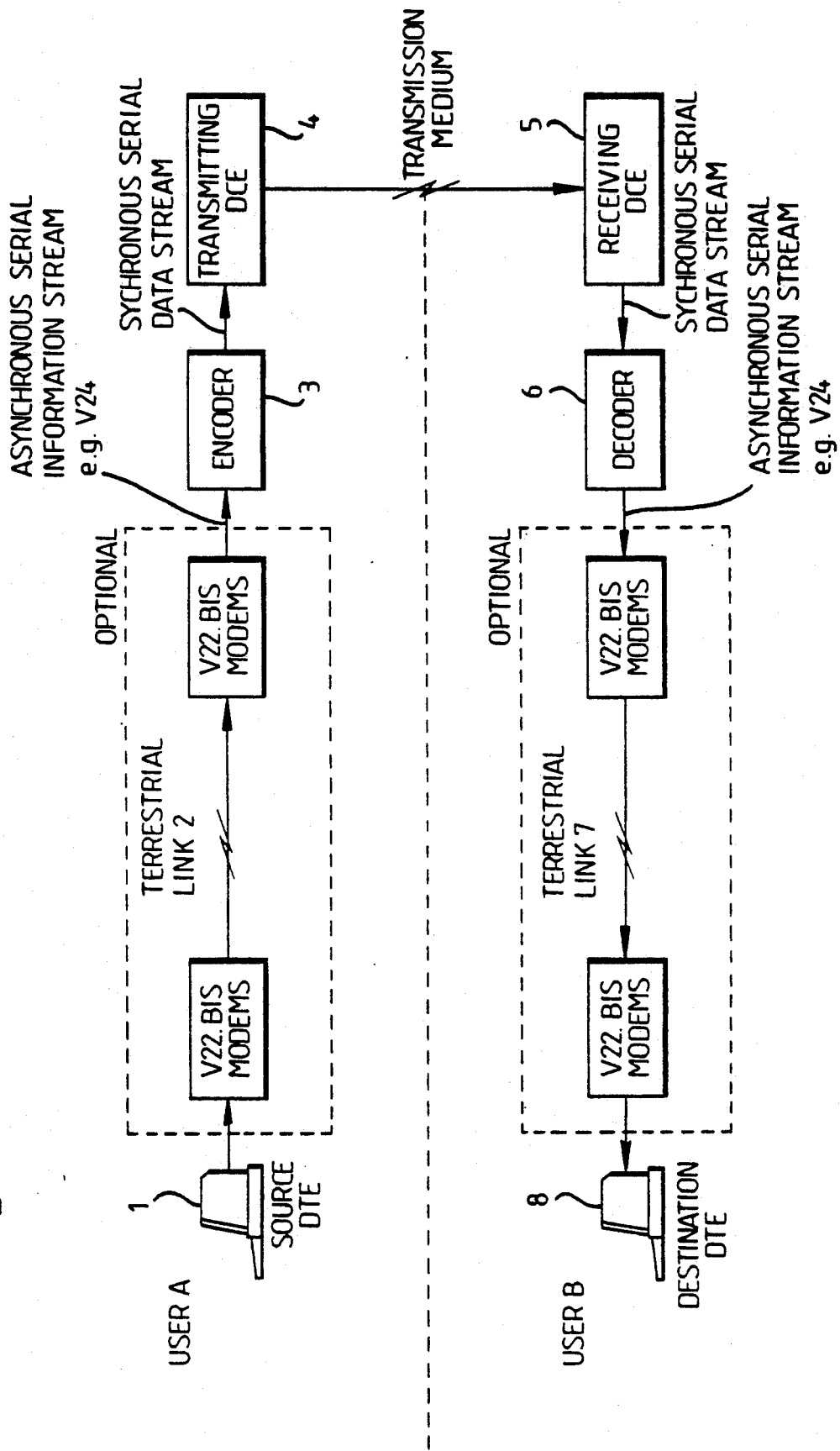
FIG. 1 is a schematic diagram of a communications system according to the preferred embodiment of the invention.

Referring first to FIG. 1, a communication system of the preferred embodiment comprises in one part a source data terminal equipment (DTE) 1, at a user A, connected via an asynchronous serial, terrestrial data link 2, e.g. V24, to an encoder 3 which is in turn connected via a synchronous data link to transmitting data communications equipment (DCE) 4, and the system comprises in another part a receiving DCE 5, connected via a synchronous data link to a decoder 6, which is in turn connected via an asynchronous serial terrestrial link 7 to a destination DTE 8 at a user B. In this illustrative example the link between transmitting DCE 4 and receiving DCE 5 is via a satellite link (not shown) which is synchronous in operation.

Figure 2:
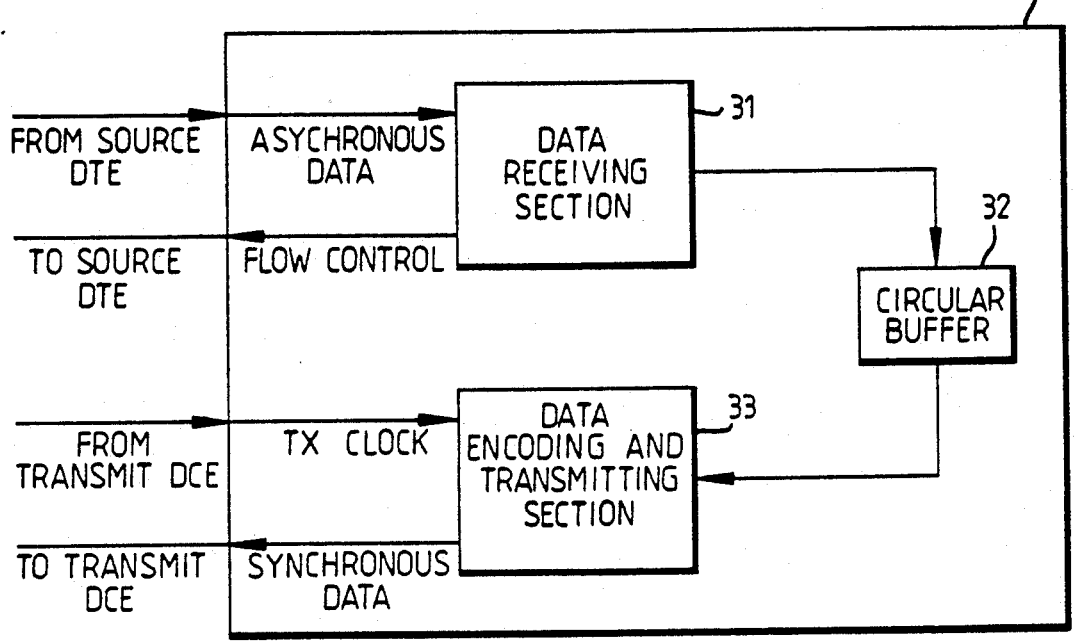
FIG. 2 is a schematic, functional diagram of an encoder forming part of the communication system of FIG. 1.

The encoder 3 of FIG. 1 is shown in schematic functional terms in FIG. 2. The encoder 3, and decoder 6 described below, may be implemented in dedicated hardware, e.g. specific digital processing equipment or as a controlled computational device e.g. 68000 microprocessor. The functional representation of FIG. 2 is chosen to illustrate the principles of the preferred embodiment which are not implementation specific. The encoder has three main functional blocks: data receiving section 31 which receives asynchronous data over data link 2 from source DTE 1, and provides flow control to the source DTE 1 over that data link, and which provides an output to circular buffer 32, which in turn provides an output to data encoding and transmitting section 33 which also receives a transmit (TX) clock signal from transmitting DCE 4 and provides a synchronous data output to DCE 4. The operation of the encoder 3 will be described in more detail below.

Figure 3:
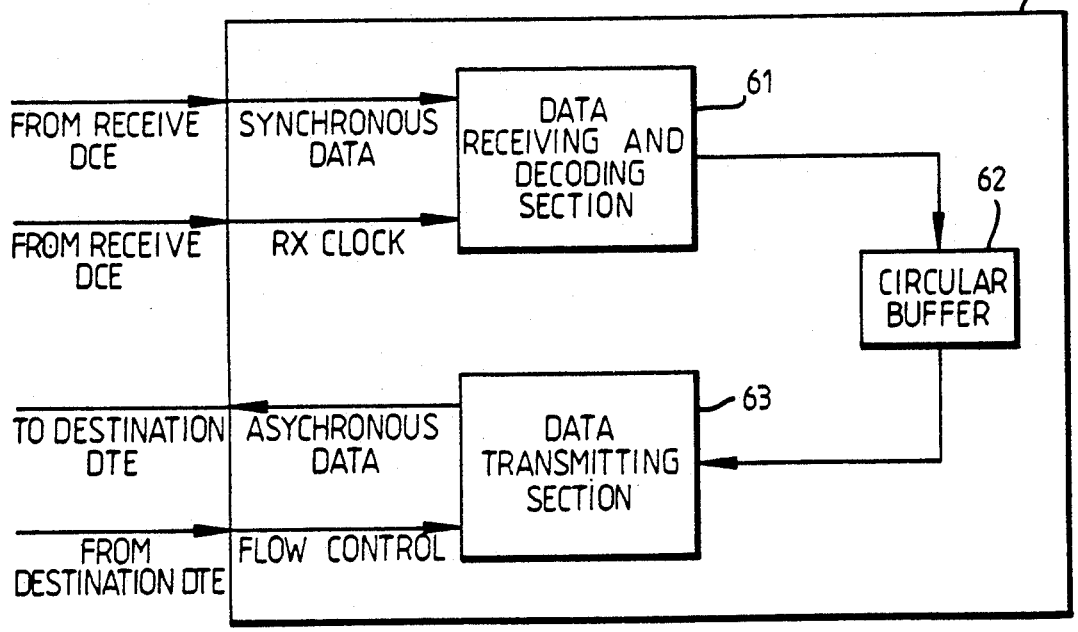
FIG. 3 is a schematic, functional diagram of a decoder forming part of the communications system of FIG. 1.

The decoder 6 is shown, in functional block terms, in FIG. 3, and has a data receiving and decoding section 61 which receives from receiving DCE 5 synchronous data and received (RX) clock, and provides data to circular buffer 62 which is connected to data transmit section 63 which also has a flow control input from destination DTE 8 and provides an asynchronous data output to the destination DTE 8.

The operation of the system of the preferred embodiment will now be described. Data is transmitted in the form of an asynchronous serial stream from DTE 1 of the user A, over the data link 2. The data is received by the encoder 3. The synchronous stream that is output from the encoder 3 is fed to transmitter DCE 4 which controls the interface to the transmission medium (e.g. satellite link).

The data is received from the transmission medium by the receiving DCE 5, which feeds the data in the form of a synchronous serial stream to decoder 6. The decoder then sends the user data to the equipment of user B in the form of an asynchronous serial stream.

The operation algorithm of the encoder 3 will now be described in more detail with reference to FIGS. 2 and 4. An implementation of the encoding algorithm can be considered in two parts, the interface to the source DTE 1 via the asynchronous link 2 and the interface to the transmitting DCE 4 using synchronous clock and data lines.

Figure 4:
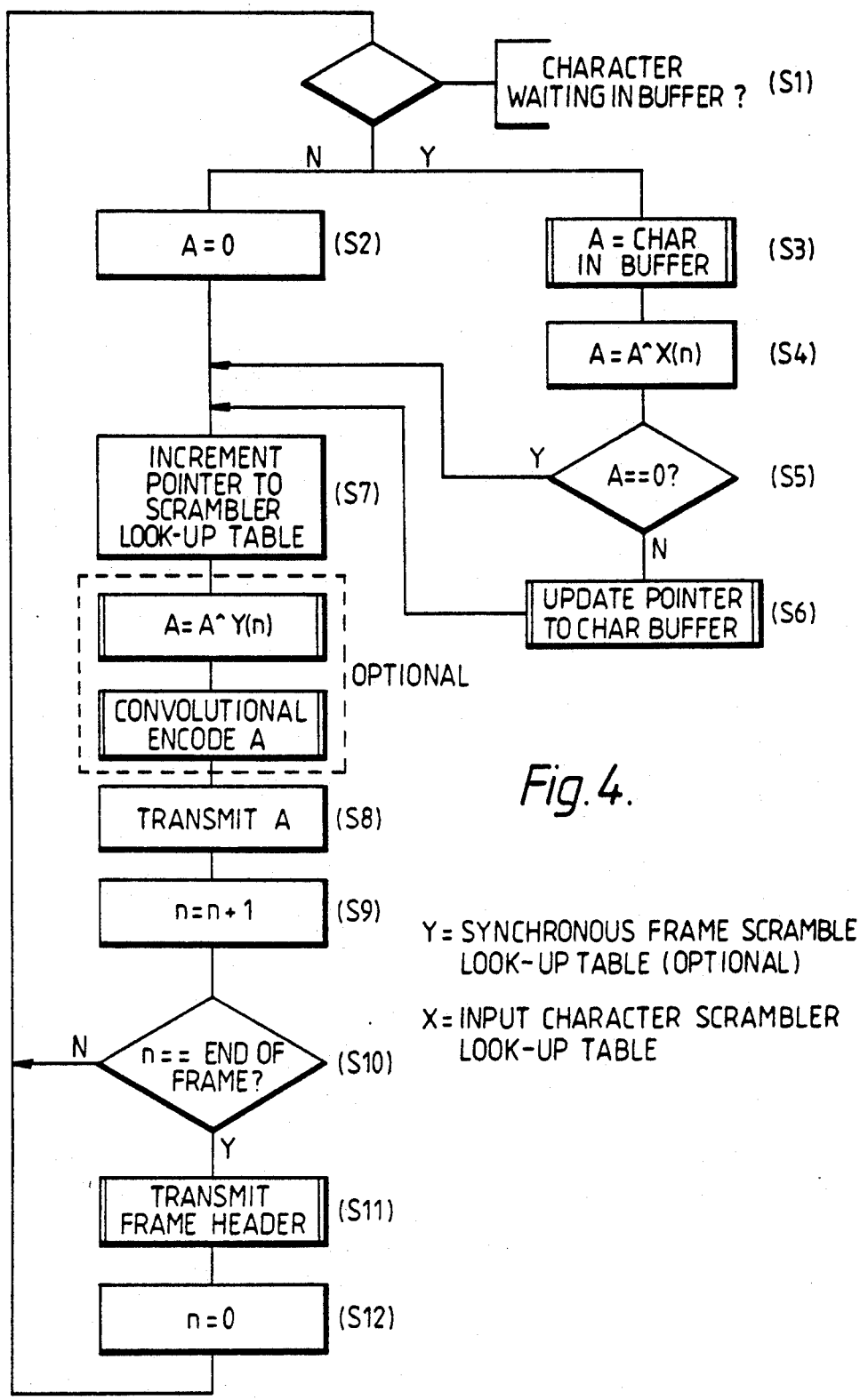
FIG. 4 is a flow diagram illustrating the operation of the encoder of FIG. 2.

The encoding algorithm is in part realised in the encoding and transmitting section 33 as shown in FIG. 4. The encoding section 33 operates in synchronism with the transmit data stream. When data is required by the transmitting section 33, the character buffer 32 is checked to see if data is present (FIG. 4 (S1)). If there is no information present then the pointer to read information from the circular buffer is not updated and a null character is sent to the transmit routines (S2). If information is present in the buffer then the next character in the buffer is read (S3) into a temporary location and scrambled by a bit-wise exclusive-or process (S4). If the result of the scrambling process is such that the scrambled character is the same as the null character (S5), then the pointer to read information from the circular buffer is not updated, and the null character is sent to the transmit routine. If the result is a non-null character then the resulting character is sent to the transmit routine and the pointer to read information from the circular buffer is updated (S6) to point to the next character location in the buffer.

The scrambling process can be achieved using a look-up table which contains all scrambling templates required for transmission of the entire frame, and a pointer which is incremented (S7) each time a character is transmitted over the synchronous link. In this way the scrambler operates in synchronism with the transmitted data stream rather than the received data stream. The reason this is important is that it means that the transmit and receive scramblers are synchronous and providing each character in the scrambling table is different, each character can only be delayed by one character period over the synchronous link.

The data is formed into blocks for transmission in steps S8-S12 as will be apparent from FIG. 4.

FIG. 4 illustrates an optional inclusion of an additional scrambler and convolutional encoder of the data after the output from the character scrambler. The convolutional encoder is only provided if the error rate over the synchronous link is significant, and the increase in overhead required is acceptable. The additional scrambler operates by inversion of all the symbols of a character dependent upon the output of another pseudo-random generator. This scrambler is provided to enable clock recovery during periods when data is absent from the synchronous link, and in the case of a radio frequency link, to avoid dramatic changes in the spectrum of the transmitted signal when data is absent. The requirement for this feature is reduced by employing a null character consisting of a bit pattern that contains 0's and 1's.

Referring to FIGS. 3 and 5, an implementation of the decoding algorithm can also be considered in two parts: the interface to the receive DCE 5 using the synchronous clock and data lines, and the interface to the destination DTE 8 via the asynchronous link 7.

The decoding algorithm is in part realised in the receiving and decoding section and is shown in FIG. 5. The decoding algorithm also operates in synchronism with the synchronous link data rate. When a character has been received from the synchronous link (S101), if the character is the null character then this is discarded (S102), otherwise the information is descrambled (S103) and placed in the circular buffer (S104) for transmission over the asynchronous serial link. The descrambling at S103 is carried out using a descrambling table which is the same as the scrambling table used in encoder 3. Finally, the pointer to the descrambler table is incremented (S105), and the routine awaits the next character from the synchronous link.

If the optional additional scrambler and convolutional encoder have been included in the encoder 3, then additional Viterbi decoder and additional descrambler stages are included in the decoder 4, and operate on received characters prior to the operation of steps S102–S108 (see FIG. 5).

Further aspects of the preferred implementation of the invention will now be reviewed.

The effect of bit errors on the information while being transferred over the synchronous link is very dependent upon the utilisation of the available capacity of the synchronous link. When the system is utilised at close to full capacity, that is heavily loaded, very few null characters are transmitted over the synchronous link, and the effect of errors is simply to corrupt the user information as would be the case if bit errors occurred over the asynchronous link. When the amount of information on the synchronous link is considerably below maximum capacity, there are a large number of null characters present. If a null character is corrupted then the corrupted character will be descrambled by the decoder and transmitted along the asynchronous link to the destination DTE, USER B in FIG. 1. The destination DTE will therefore receive additional characters of a random nature if bit errors occur in the null character.

One way of minimising the effects of errors on the link is to provide some form of data integrity checking before the decoding is performed, and this could take the form of block error checking such as single bit parity checking, or by reservation of extra characters to be used as additional null characters and sequencing the null characters for validation. An attractive approach is to introduce convolutional encoding and Viterbi decoding as shown in the implementation diagrams FIG. 4 and FIG. 5 referred to above. This has the effect of significantly reducing the bit error probability for synchronous links which are experiencing severe errors with a Gaussian probability density function. The level of protection that is applied to the synchronous link will depend very much upon the application, and it is entirely possible in a well designed system that the destination DTE will perform data validation which will obviate the requirement for coding of information over the synchronous link.

When a frame structure is present such as in the synchronous link of the preferred implementation it allows synchronisation of the signals in the encoder and decoder, because once synchronisation to the frame structure has been established, a scrambler can operate in synchronism with the data being transmitted over the synchronous link. The scrambler operates on a character by character basis and in the preferred embodiment adjacent characters from the scrambler are different. The scrambling character values are generated using a pseudo random process. The elements of the scrambler look-up table could, for example, be generated using maximal length feed back shift registers as is known in the art. Preferably the length of the generator contains the same number of bits as each character, and this is sufficient to ensure that adjacent scrambling characters cannot contain the same value. The overhead of the system is related to the probability of a user's character being the same as the null character after the scrambling process. This is directly related to the number of bits per character over the asynchronous link. For characters containing eight bits per symbol, the additional overhead is 1/256 of the asynchronous information rate. Additional overhead to provide the frame structure is required, but this will usually only consist of a header in the form of a unique word requiring generally not more than 1% of the capacity.

A suitable frame structure for operation of the described embodiment requires only sufficient information to allow the system to recover the timing synchronisation. This will have a large dependence upon the characteristics of the synchronous link. For example the noise experienced over a transmission line with several repeater stages will consist mainly of accumulated phase noise and shot noise, with a small amount of thermal noise (wideband with respect to the signal bandwidth), whereas a radio link will experience severe thermal noise effects and may include fading, adjacent and co-channel interference and non-linear effects, and the synchronisation performance will be far worse for a signal with the same amount of synchronisation information. For a satellite system, a suitable frame structure would include a unique synchronisation word requiring 1% to 2% of the system information in the frame. The synchronisation word would be distributed throughout the frame to improve acquisition performance and reduce the maximum throughput delay.

I claim:

1. A communications system for handling a stream of data characters comprising:
a transmitting part having:
means for encoding an incoming data character into an encoded character,
means for determining whether an encoded character is one of a predetermined set of characters,
means, responsive to the determining means, for controlling the encoding means to encode an incoming data character a plurality of times until an encoded character occurs which is not one of the predetermined set of characters, and
means for transmitting either each encoded character, or when an encoded character is one of the predetermined set,
a character from the predetermined set; and
a receiving part having:
means for receiving a transmitted character,
means for determining whether or not a received character is one of the predetermined set of characters, means for decoding a received character so that a decoded character is provided from the receiver when the corresponding received character is determined not to be one of the set of characters.

2. A communications system as claimed in claim 1 wherein the encoding means has means for performing a scrambling operation on the data characters.

3. A communications system as claimed in claim 1 wherein the means for encoding has means for encoding data characters in a pseudo random sequence.

4. A communication system as claimed in claim 3 wherein the scrambling means has means for performing a bit-wise exclusive-or scrambling operation.

5. A communication system as claimed in claim 1 wherein the transmitting means has means for transmitting the encoded characters synchronously to the receiving means.

6. A communication system as claimed in claim 5 wherein the encoder and the decoder are synchronised by the synchronous transmissions between the transmitting part and the receiving part.

7. A communication system as claimed in claim 1 wherein the set of characters is selected from one of the following sets:
   a) a null character
   b) a non-null character
   c) either a) or b) and one or more other characters.

8. A data transmission system in which one or more characters are reserved for system use comprising an encoder, a transmitter, a receiver and a decoder; a data stream entering the system is coded by the encoder a character at a time by the encoder and a test for the reserved character is performed on each encoded character, if this is positive the character is encoded again, all encoded characters are transmitted by the transmitter, after the transmitted characters have been received in the receiver the test for the reserved character is performed on each received character, if this is negative the received character is decoded by the decoder and passed out of the system as data.

9. A system as claimed in claim 8 wherein the transmission is synchronous and the incoming data stream is asynchronous.

10. A system as claimed in claim 8 wherein the reserved character is a null character.

11. A system as claimed in claim 8, wherein the encoder and decoder employ a pseudo random process.

12. A system as claimed in claim 8, wherein encoder characters resulting from successively encoding the same character are different.

13. A system as claimed in claim 8 wherein the encoder and decoder utilise a look-up table.

14. A method of transmitting data characters between a transmitter and a receiver comprising the steps of:
   at the transmitter: encoding an incoming data character a plurality of times until an encoded character occurs which is not one of a predetermined set of characters; and
      transmitting each encoded character, whether or not that encoded character is one of the predetermined set; and
   at the receiver the steps of
      receiving a transmitted character; and
      providing a decoded output character from the receiver when the corresponding received character is determined not to be the one of the set of characters.

15. A communication system in which data characters are each encoded in an encoder a plurality of times until an encoded character occurs which is not one of a predetermined set of characters; each encoded character, whether or not that encoded character is one of the predetermined set is transmitted by a transmitter to a receiver and a decoded output character provided from a decoder when the corresponding received character is determined not to be the one of the set of characters.

16. A communication system for transmitting data from a discontinuous stream of data over a data link requiring a continuous stream of data, comprising:
   a transmitting part having:
      means for encoding data in an incoming data stream on a character by character basis, which encoding varies between successive characters of the continuous stream,
      means for determining whether an encoded character is one of a predetermined set of characters,
      control means, responsive to the determining means, for controlling the encoding means to encode incoming data a plurality of times until an encoded character occurs which is not one of the predetermined set of characters,
      detection means for detecting the absence of data in the incoming data stream,
      and transmitting means, responsive to the detection means, for transmitting in the absence of incoming data one of the predetermined set of characters, or when incoming data is present, each encoded character, unless an encoded character is one of the predetermined set when one of the predetermined set of characters is transmitted; a receiving part having:
      means for receiving transmitted characters to maintain the receiving part in synchronism with the transmitting part;
      means for determining whether or not a received character is one of the predetermined set of characters;
      means for decoding a received character, whereby a decoded character is provided from the receiver when the corresponding received character is determined not to be the one of the set of characters, and the decoding means being kept co-ordinated with the encoding means of the transmitting part through the receipt of successive transmitted characters.

17. A communication system as claimed in claim 16 wherein the said predetermined set comprises one character.

18. A communications system as claimed in claim 16 wherein a null character is a member of the predetermined set of characters.

19. A communications system as claimed in claim 16, wherein the incoming data stream is asynchronous and the continuous data stream is synchronous.

20. A system as claimed in claim 16, wherein the encoder and decoder employ a pseudo random process.

21. A system as claimed in claim 16 wherein the encoder and decoder utilise a look-up table.

22. In a communications system wherein a stream of provided character data are successively encoded, transmitted from one site, received at another site and decoded thereat to reproduce said stream of character data, the improvement comprising:
   a repetitive encoder located at said first site which has been conditioned to encode a plurality of times and transmit each character data if the encoded character data equals at least one predetermined data value but to otherwise singly encode and transmit successive provided character data.

23. An improved communications system as in claim 22 further comprising:
a decoder located at said second site which has been conditioned to decode each received encoded character data unless it equals said at least one predetermined data value.

24. An improved method of operating a communications system wherein a stream of provided character data are successively encoded, transmitted from one site, received at another site and decoded thereat to reproduce said stream of character data, the improvement comprising:
encoding a plurality of times and transmitting each character data if the encoded character data equals at least one predetermined data value but otherwise singly encoding and transmitting successive provided character data.

25. An improved method as in claim 24 further comprising:
decoding and retaining each received encoded character data unless it equals said at least one predetermined value.

* * * * *